(12) United States Patent
Weng et al.

(10) Patent No.: US 10,602,101 B2
(45) Date of Patent: Mar. 24, 2020

(54) LIGHT SOURCE MODULE AND PROJECTION DEVICE

(71) Applicant: Coretronic Corporation, Hsin-Chu (TW)

(72) Inventors: Yi-Hsuang Weng, Hsin-Chu (TW); Chih-Hsien Tsai, Hsin-Chu (TW); Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/214,148

(22) Filed: Dec. 10, 2018

(65) Prior Publication Data

US 2019/0182459 A1 Jun. 13, 2019

(30) Foreign Application Priority Data

Dec. 12, 2017 (CN) .......................... 2017 1 1314211

(51) Int. Cl.
*H04N 9/31* (2006.01)
*G03B 21/20* (2006.01)
(Continued)

(52) U.S. Cl.
CPC ......... *H04N 9/3114* (2013.01); *G03B 21/204* (2013.01); *G03B 21/208* (2013.01);
(Continued)

(58) Field of Classification Search
CPC .... G03B 21/28; G03B 21/142; G03B 21/204; G03B 21/206; G03B 21/208;
(Continued)

(56) References Cited

U.S. PATENT DOCUMENTS

| 8,016,422 B2 | 9/2011 | Silverstein et al. |
| 8,794,765 B2 | 8/2014 | Shibasaki et al. |

(Continued)

FOREIGN PATENT DOCUMENTS

| CN | 101822066 | 9/2010 |
| CN | 101937161 | 1/2011 |

(Continued)

*Primary Examiner* — Sultan Chowdhury

(74) *Attorney, Agent, or Firm* — JCIPRNET

(57) ABSTRACT

A light source module includes an excitation light source providing an excitation light beam; a light guiding apparatus disposed on a light path of the excitation light beam and; a light collecting element disposed on a first transmission path and a second transmission path; a light homogenizing element disposed on the first transmission path; and a wavelength conversion element disposed on the second transmission path. The light guiding apparatus swings sequentially along a reference axis of the light path. Through the swinging action, the excitation light beam is transmitted along the first transmission path and the second transmission path at a first timing and a second timing, respectively. Then, the excitation light beam passes through the light collecting element. The light homogenizing element receives the excitation light beam. The wavelength conversion element converts the excitation light beam passing through the light collecting element into an excited light beam.

15 Claims, 10 Drawing Sheets

(51) Int. Cl.
*G03B 33/08* (2006.01)
*G03B 21/28* (2006.01)

(52) U.S. Cl.
CPC ......... *G03B 21/2013* (2013.01); *G03B 21/28* (2013.01); *G03B 33/08* (2013.01); *H04N 9/3155* (2013.01)

(58) Field of Classification Search
CPC ........... G03B 21/2013; G03B 21/2033; G03B 33/02; G03B 33/04; G03B 33/06; G03B 33/08; H04N 9/315; H04N 9/3114; H04N 9/3115; H04N 9/3123; H04N 9/3135; H04N 9/3155
See application file for complete search history.

(56) References Cited

U.S. PATENT DOCUMENTS

| | | | |
|---|---|---|---|
| 10,061,188 B2* | 8/2018 | Wang | F21V 29/70 |
| 10,353,282 B2* | 7/2019 | Yamamoto | G01S 17/36 |
| 2006/0170873 A1 | 8/2006 | Kato | |
| 2010/0046234 A1 | 2/2010 | Abu-Ageel | |
| 2011/0096300 A1 | 4/2011 | Shibasaki | |
| 2012/0243205 A1 | 9/2012 | Lin | |
| 2013/0250255 A1 | 9/2013 | Kurosaki et al. | |
| 2013/0278902 A1 | 10/2013 | Chen et al. | |
| 2014/0132937 A1 | 5/2014 | Daniels | |
| 2015/0077714 A1* | 3/2015 | Hsieh | G03B 21/204 353/31 |
| 2016/0252722 A1* | 9/2016 | Li | G02B 26/008 362/84 |

FOREIGN PATENT DOCUMENTS

| | | |
|---|---|---|
| CN | 102289140 | 12/2011 |
| CN | 102289141 | 12/2011 |
| CN | 102314060 | 1/2012 |
| CN | 102722073 | 12/2014 |
| CN | 102854723 | 2/2015 |
| CN | 205301794 | 6/2016 |
| CN | 205787562 | 12/2016 |
| TW | 201100864 | 1/2011 |
| TW | 201126254 | 8/2011 |
| WO | 2012022241 | 2/2012 |

* cited by examiner

LIGHT SOURCE MODULE AND PROJECTION DEVICE

CROSS-REFERENCE TO RELATED APPLICATION

This application claims the priority benefit of China application serial no. 201711314211.2, filed on Dec. 12, 2017. The entirety of the above-mentioned patent application is hereby incorporated by reference herein and made a part of this specification.

BACKGROUND OF THE INVENTION

Field of the Invention

The invention relates to an optical module and an optical device. More particularly, the invention relates to a light source module and a projection device.

Description of Related Art

As technology advances, a solid state illumination (SSI) source, such as laser diode, has been widely used in light sources required for projection devices. The emission spectrum of the SSI source may be used as a solid color light source for the projection device, and the light source required for projecting a picture may be well provided by exciting a wavelength converting substance e.g., fluorescent powder. Thereby, a light source system capable of achieving light collecting effects may be formed through the transmission and reflection by a circular reflector. In the existing light source systems, the circular reflectors equipped with openings often allow laser beams to pass through, or inner surfaces of the circular reflectors are coated film to reflect the light beams excited by the wavelength converting substance. However, in either case, the laser beams or the excitation beams may partially wastage, which further reduces the optical quality of the projection device.

The information disclosed in this "BACKGROUND OF THE INVENTION" section is only for enhancement of understanding of the background of the described technology and therefore it may contain information that does not form the prior art that is already known to a person of ordinary skill in the art. Furthermore, the information disclosed in this "BACKGROUND OF THE INVENTION" section does not mean that one or more problems to be resolved by one or more embodiments of the invention were acknowledged by a person of ordinary skill in the art.

SUMMARY OF THE INVENTION

The invention provides a light source module and a projection device that improve optical quality.

Other objects and advantages of the invention may be further illustrated by the technical features broadly embodied and described as follows.

In order to achieve one or a portion of or all of the objects or other objects, an embodiment of the invention provides a light source module adapted to provide an illumination light beam. The light source module includes an excitation light source, a light guiding apparatus, a light collecting element, a light homogenizing element, and a wavelength conversion element. The excitation light source provides an excitation light beam. The light guiding apparatus is disposed on a light path of the excitation light beam and is adapted to swing sequentially along a reference axis of the light path, so as to change a transmission path of the excitation light beam. Through the swinging action of the light guiding apparatus, the excitation light beam is transmitted along a first transmission path and a second transmission path at a first timing and a second timing, respectively. The light collecting element is disposed on the first transmission path and the second transmission path of the excitation light beam and adapted to allow the excitation light beam to pass through. The light homogenizing element is disposed on the first transmission path of the excitation light beam and adapted to receive the excitation light beam passing through the light collecting element. The wavelength conversion element is disposed on the second transmission path of the excitation light beam and adapted to convert the excitation light beam passing through the light collecting element into an excited light beam. Here, the light collecting element reflects the excited light beam to the light homogenizing element, and the homogenizing element is adapted to receive the excitation light beam and the excited light beam, so as to generate the illumination light beam.

In order to achieve one or a portion of or all of the objects or other objects, another embodiment of the invention provides a projection device adapted to provide a projection light beam. The projection device includes a light source module, an optical engine module, and a lens. The light source module is adapted to provide an illumination light beam. The light source module includes an excitation light source, a light guiding apparatus, a light collecting element, a light homogenizing element, and a wavelength conversion element. The excitation light source provides an excitation light beam. The light guiding apparatus is disposed on a light path of the excitation light beam and is adapted to swing sequentially along a reference axis perpendicular to the light path, so as to change a transmission path of the excitation light beam. Through the swinging action of the light guiding apparatus, the excitation light beam is transmitted along a first transmission path and a second transmission path at a first timing and a second timing, respectively. The light collecting element is disposed on the first transmission path and the second transmission path of the excitation light beam and adapted to allow the excitation light beam to pass through. The light homogenizing element is disposed on the first transmission path of the excitation light beam and adapted to receive the excitation light beam passing through the light collecting element. The wavelength conversion element is disposed on the second transmission path of the excitation light beam and adapted to convert the excitation light beam passing through the light collecting element into an excitation light beam. The optical engine module is disposed on a transmission path of the illumination light beam and adapted to convert the illumination light beam into an image light beam. The lens is disposed on a transmission path of the image light beam and adapted to convert the image light beam into the projection light beam. Here, the light collecting element reflects the excitation light beam to the light homogenizing element, and the homogenizing element is adapted to receive the excitation light beam and the excitation light beam.

According to the above description, the embodiments of the invention have at least one of the following advantages and effects. In an embodiment of the invention, through the sequential swinging action of the light guiding apparatus, the excitation light beam provided by the excitation light source may be transmitted along the first transmission path and the second transmission path. At the first timing, the excitation light beam is sequentially transmitted along the first transmission path by the light guiding apparatus through the light collecting element and the light homogenizing element. At the second timing, the excitation light beam is sequentially transmitted along the second transmission path by the light guiding apparatus through the light collecting element and the wavelength conversion element, and the excitation light beam is converted into the excited light beam, reflected back to the light collecting element, and reflected by the light collecting element to the light homogenizing element. Thereby, the loss of the excitation beam in the light source module may be reduced to increase the usage efficiency of the beam energy, thereby improving the optical quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
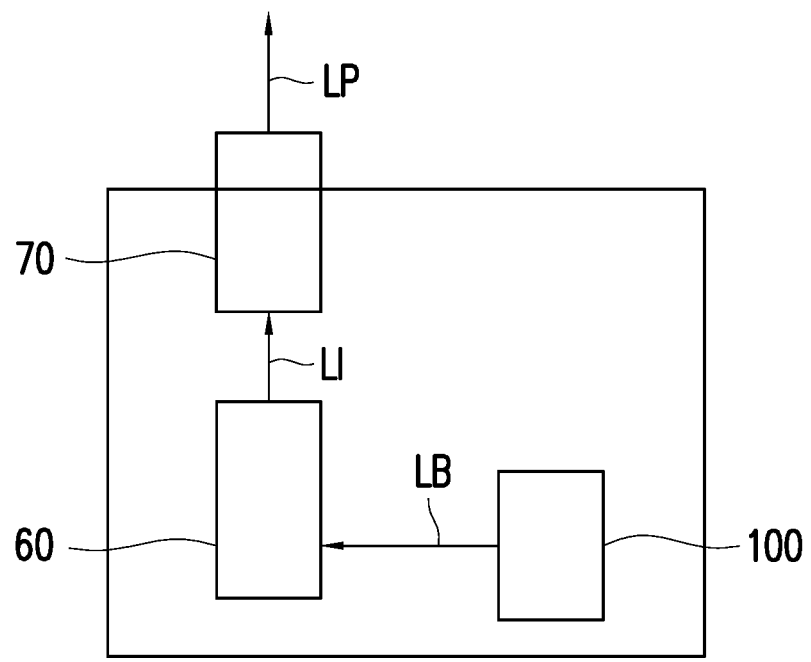
FIG. 1 is a schematic view of a projection device according to an embodiment of the invention.
Figure 1:
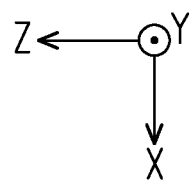

FIG. 1 is a schematic view of a projection device according to an embodiment of the invention. With reference to FIG. 1, in this embodiment, the projection device 50 may be regarded as being disposed in a space defined by a rectangular coordinate system formed by an X-axis, a Y-axis, and a Z-axis. The projection device 50 includes a light source module 100, an optical engine module 60, and a lens 70. The light source module 100 provides an illumination light beam LB. The optical engine module 60 is disposed on a transmission path of the illumination light beam LB and converts the illumination light beam LB into an image light beam LI. The lens 70 is disposed on a transmission path of the image light beam LI and converts the image light beam LI into a projection light beam LP, so as to form a projection image.

The optical engine module 60 may be a reflective light modulator, such as a liquid crystal on silicon (LCoS) panel or a digital micro-mirror device (DMD), and so on, for instance. Besides, the optical engine module 60 may also be a transmissive light modulator, such as a transparent liquid crystal panel, an electro-optical modulator, a magneto-optic modulator, an acousto-optic modulator (AOM), and so forth. However, the type of the optical engine module 60 is not limited in the invention. In the present embodiment, the detailed steps and the implementation of the method of converting the illumination light beam LB into the image light beam LI by the optical engine module 60 may be well known to people skilled in the art and therefore will not be further explained.

The lens 70 includes a combination of one or more optical lenses having a refractive power, e.g., a biconcave lens, a biconvex lens, a concave-convex lens, a convex-concave lens, a plano-convex lens, a meniscus lens, a plano-concave lens, and a combination of the above lenses. In an embodiment of the invention, the lens 70 may also include a planar optical lens that converts the image light beam LI into the projection light beam LP through reflection or transmission and reflects the projection light beam LP to a projection target. However, the type of the lens 70 is not limited in the invention.

Figure 2A:
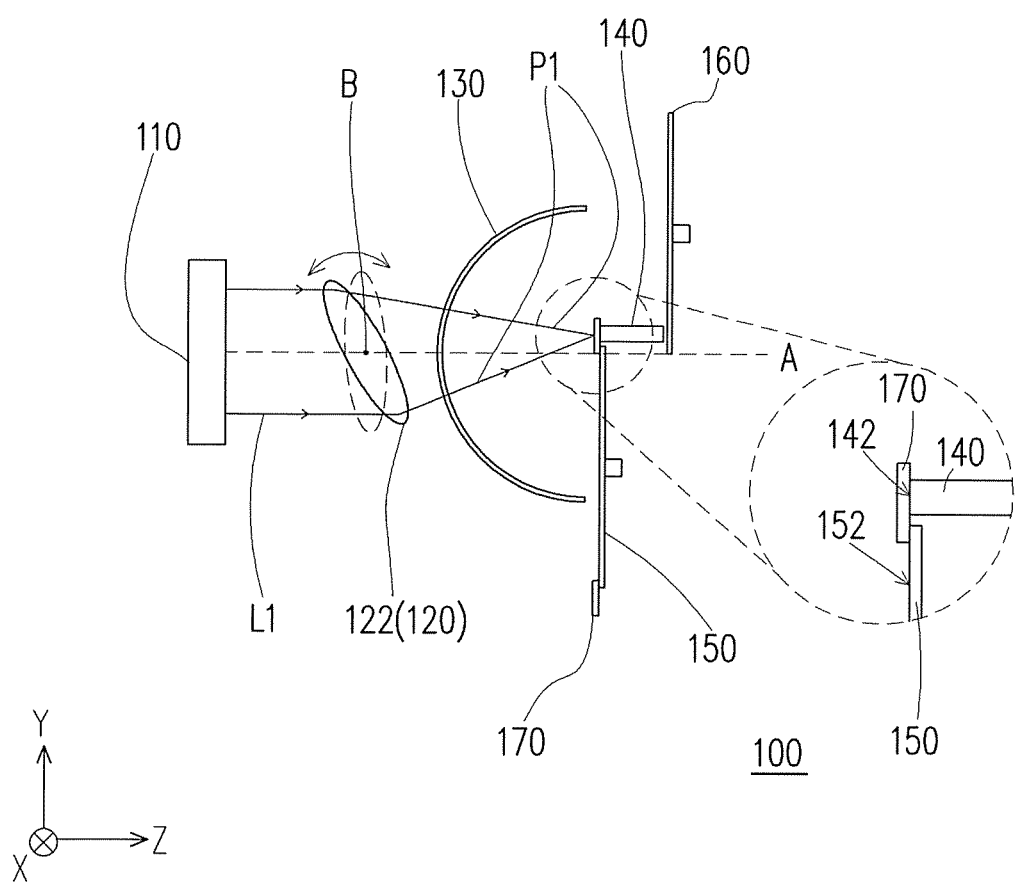
FIG. 2A and FIG. 2B are schematic side views of the light source module depicted in FIG. 1 at a first timing and a second timing.
Figure 2B:
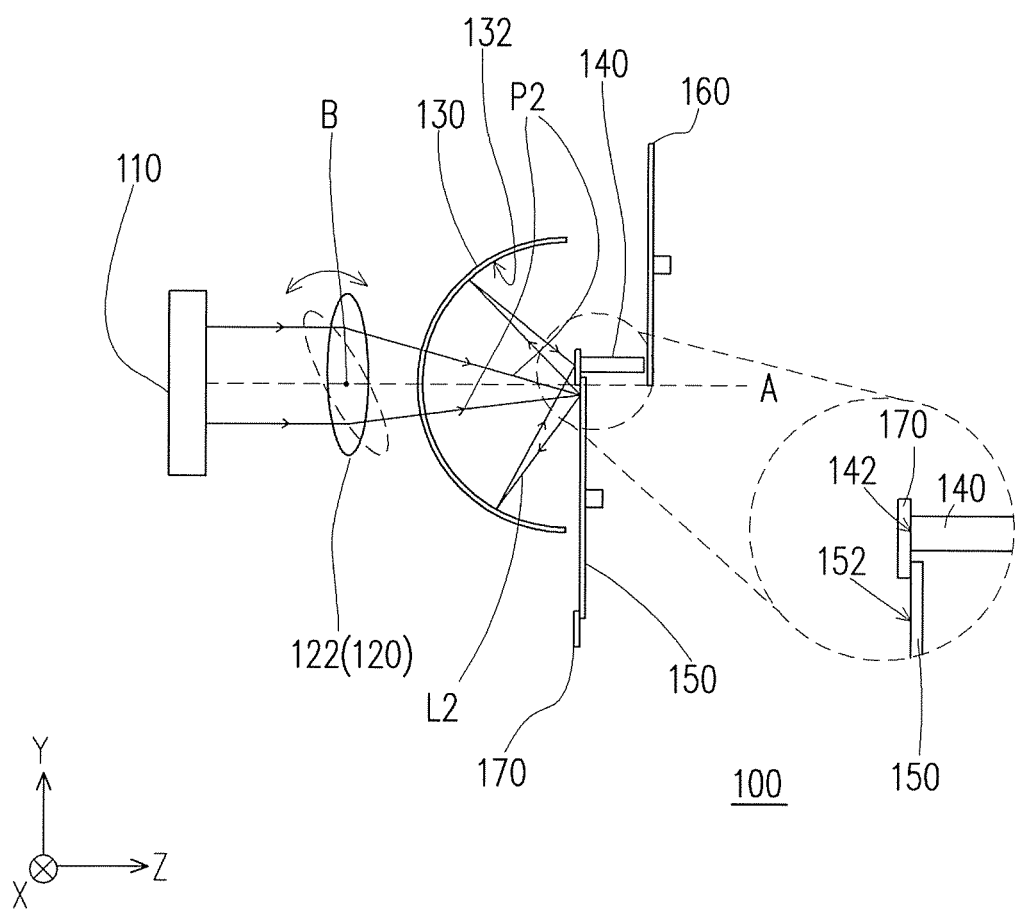

FIG. 2A and FIG. 2B are schematic side views of the light source module depicted in FIG. 1 at a first timing and a second timing. With reference to FIG. 1 to FIG. 2B, the first timing and the second timing refers to the time at which the light guiding apparatus in the light source module 100 passes by the two swinging positions. In the present embodiment, the light source module 100 includes an excitation light source 110, a light guiding apparatus 120, a light collecting element 130, a light homogenizing element 140, and a wavelength conversion element 150. The excitation light source 110 provides an excitation light beam L1. In this embodiment, the excitation light beam L1 is, for example, a blue light beam with a wavelength of 445 nm or 455 nm, but the invention is not limited thereto.

The light guiding apparatus 120 is disposed on a light path A of the excitation light beam L1 and is adapted to swing sequentially along a reference axis B perpendicular to the light path A, so as to change a transmission path of the excitation light beam L1. In the present embodiment, the light guiding apparatus 120 is a lens element 122. Specifically, the light guiding apparatus 120 includes a movable member, which is, for example, an actuator capable of swinging the lens element 122 to be at least two different angles, such as a voice coil motor, a stepper motor, an ultrasonic motor, a servomotor, or any other actuator that can be rotated at an angle; however, the invention is not limited thereto. In other words, the light guiding apparatus 120 swings the lens element 122 by the actuator to change the transmission path of the excitation light beam L1, as shown in FIG. 2A. However, in other embodiments, the light guiding apparatus 120 may also be a combination of different optical elements, and the invention is not limited thereto.

Specifically, in this embodiment, the direction of the light path A is parallel to the Z-axis direction, and the direction of the reference axis B perpendicular to the direction of the light path A is parallel to any direction on the planes formed by the X-axis and the Y-axis. Hence, when the light guiding apparatus 120 sequentially swings along the reference axis B, the excitation light beam L1 transmitted through the light guiding apparatus 120 is deflected by the swinging action of the light guiding apparatus 120 and is then sequentially transmitted to other elements along directions of different transmission paths. As exemplarily shown in FIG. 2A and FIG. 2B, through the swinging action of the light guiding apparatus 120, the excitation light beam L1 is transmitted along a first transmission path and a second transmission path to other elements at a first timing (FIG. 2A) and a second timing (FIG. 2B), respectively.

The light collecting element 130 is disposed on a first transmission path P1 and a second transmission path P2 of the excitation light beam L1 and allows the excitation light beam L1 to pass through. The light collecting element 130 is, for example, a hemispherical reflector. Note that the light collecting element 130 provided in the present embodiment is made of a transparent material for the excitation light beam L1 to penetrate, and thus it is not necessary to additionally form any opening that allows the excitation light beam L1 to pass through nor other light splitting or collecting elements.

The light homogenizing element 140 is disposed on the first transmission path P1 of the excitation light beam L1 and receives the excitation light beam L1 passing through the light collecting element 130. The light homogenizing element 140 is, for example, an integral column, a fly-eye lens, or a combination of the above optical elements; the invention is not limited thereto.

Figure 3:
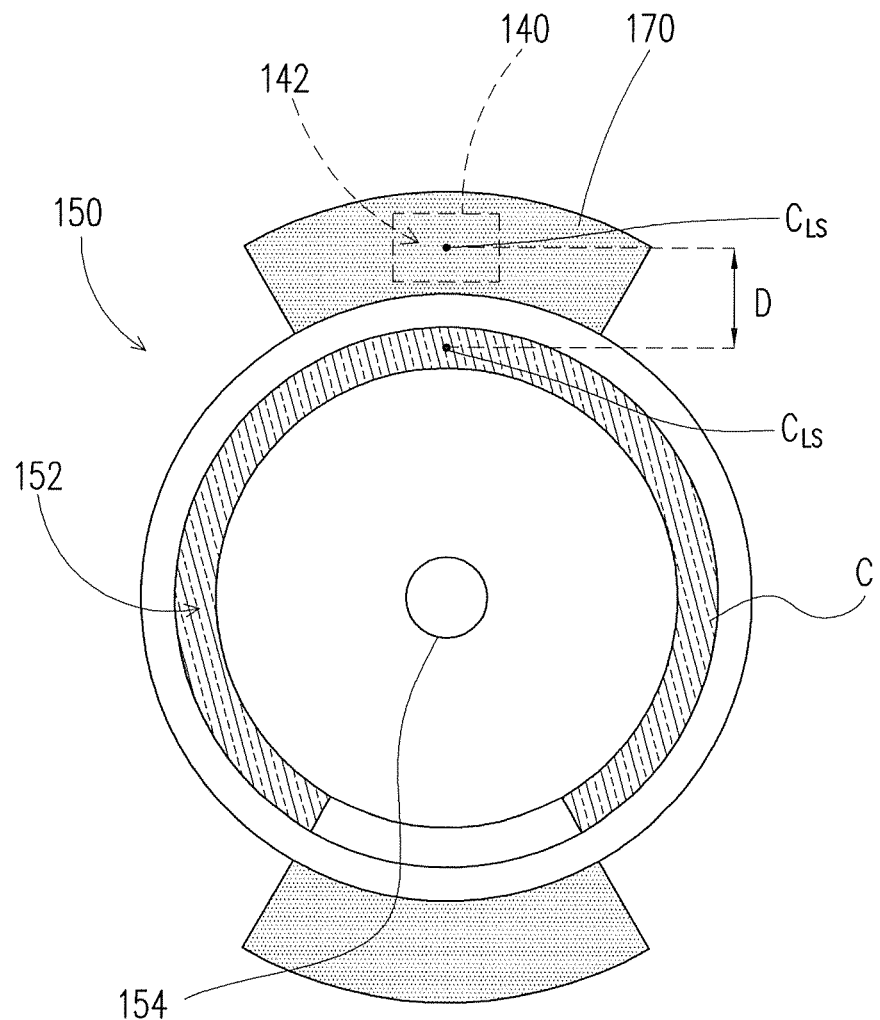
FIG. 3 is a schematic front view of the wavelength conversion element depicted in FIG. 2A.

The wavelength conversion element 150 is disposed on the second transmission path P2 of the excitation light beam L1 and converts the excitation light beam L1 passing through the light collecting element 130 into an excited light beam L2. In the present embodiment, the light exiting surface 152 of the wavelength conversion element 150 and the light incident surface 142 of the light homogenizing element 140 are coplanar. In other embodiments, the light exiting surface 152 of the wavelength conversion element 150 and the light incident surface 142 of the light homogenizing element 140 may not be coplanar. FIG. 3 is a schematic front view of the wavelength conversion element depicted in FIG. 2A. With reference to FIG. 3, particularly, the wavelength conversion element 150 has a conversion wavelength region C on the light exiting surface 152. A wavelength conversion material is disposed in the wavelength region C to convert the excitation light beam L1 into an excited light beam L2. According to the present embodiment, the conversion wavelength region C is distributed in a region adjacent to the light homogenizing element 140 in the wavelength conversion element 150 at the second timing. However, in other embodiments, the conversion wavelength region C may also be distributed over the entire area of the wavelength conversion element 150. That is, a portion of the wavelength conversion element 150 covered by the excitation light beam L1 transmitted along the second transmission path P2 may be coated, or the entire area of the wavelength conversion element 150 may be coated, which should not be construed as a limitation to the invention.

In this embodiment, the inner surface 132 of the light collecting element 130 has a film layer (not shown) that allows the excitation light beam L1 to penetrate and to reflect the excited light beam L2, wherein the film layer may by formed by coating, adhesion, and so on. Therefore, after the converted wavelength region C of the wavelength conversion element 150 converts the excitation light beam L1 into the excited light beam L2, the light collecting element 130 reflects the excited light beam L2 to the light homogenizing element 150, and the homogenizing element 150 receives the excitation light beam L1 penetrating the light collecting element 130 and the excited light beam L2 reflected by the light collecting element 130 to generate the illumination light beam LB. In the present embodiment, a distance between a center of a light spot $C_{LS}$ generated at the light homogenizing element 140 by the excitation light beam L1 along the first transmission path P1 and a center of a light spot $C_{LS}$ generated at the wavelength conversion element 150 by the excitation light beam L1 along the second transmission path P2 is equal to the minimum moving distance of the light spot while the light guiding apparatus 120 swings.

In other words, at the first timing, the excitation light beam L1 is sequentially transmitted along the first transmission path P1 through the light guiding apparatus 120 and the light collecting element 130 to the light homogenizing element 140, as shown in FIG. 2A. At the second timing, the excitation light beam L1 is sequentially transmitted along the second transmission path P2 through the light guiding apparatus 120 and the light collecting element 130 to the wavelength conversion element 150, as shown in FIG. 2B. Thereby, the energy loss of the excitation light beam L1 or the energy loss of the excited light beam L2 may be reduced in no need of arranging any light splitting or collecting element in the light source module 100, thereby increasing the use efficiency of the beam energy and improving the optical quality.

Additionally, in this embodiment, the light source module 100 further includes a light filtering element 160 (e.g., a light filtering wheel) disposed on the first transmission path P1 (e.g., behind the light homogenizing element 140); that is, the light homogenizing element 140 is disposed between the light collecting element 130 and the light filtering element 160. In other embodiments, the light filtering element 160 may also be disposed between the light collecting element 130 and the light homogenizing element 140. Alternatively, no light filtering element 160 is disposed; the invention is not limited thereto.

According to the present embodiment, the light filtering element 160 has a first region allowing the excitation light beam to pass through and a second region L2 allowing the excited light beam L2 to pass through. For instance, the excitation light beam L1 is, for example, a blue light beam, and the excited light beam L2 is, for example, a yellow light beam. The first region of the light filtering element 160 is a blue light region, and the second region includes a green light region and a red light region. Therefore, at the first timing, the excitation light beam L1 passes through the blue light region of the light filtering element 160 to filter out the non-blue light beams. At the second timing, the excited light beam L2 sequentially passes through the green light region and the red light region to sequentially filter out the non-green light beam and the non-red light beams.

Besides, in the present embodiment, the light source module 100 further includes a light scattering element 170 having scattering particles or optical micro-structures and disposed on the first transmission path P1. The light scattering element 170 has a light scattering region, and the excitation light beam L1 passes through the light scattering region at the first timing. Thereby, the angles at which the excitation light beam L1 transmitted on the first transmission path P1 and the excited light beam L2 reflected by the light collecting element 130 enter the light homogenizing element 140 are close to each other, so as to further increase the color uniformity of the illumination light beam LB.

According to the present embodiment, the light scattering element 170 is disposed on the wavelength conversion element 150 and extended from an edge of the wavelength conversion element 150 in a radial direction of the wavelength conversion element 150. Particularly, the light scattering element 170 is disposed at the edge of the wavelength conversion element 150 and extends outwardly to cover the light homogenizing element 140, and the location of the covered region corresponds to a part of the conversion wavelength region C. Hence, when the wavelength conversion element 150 rotates by a central axis 154, the light scattering element 170 is rotated to be overlapped with the light homogenizing element 140 at a part of the second timing, so that the excited light beam L2 passes through the light scattering element 170 and then enters the light homogenizing element 140.

In other embodiments, the light scattering element 170 may also be disposed on the light path before or after the light homogenizing element 140 in the same manner as the way to arrange the light filtering element 160. Alternatively, the light scattering structure may be combined onto the light filtering element 160, and a region where the light scattering structure is distributed may selectively correspond to the first region and a portion of the second region of the light filtering element 160. In detail, the light scattering structure may be distributed over the entire light filtering region of the light filtering element 160 or over the blue light region and the red light region of the light filtering element 160, and the invention is not limited thereto.

Figure 4A:
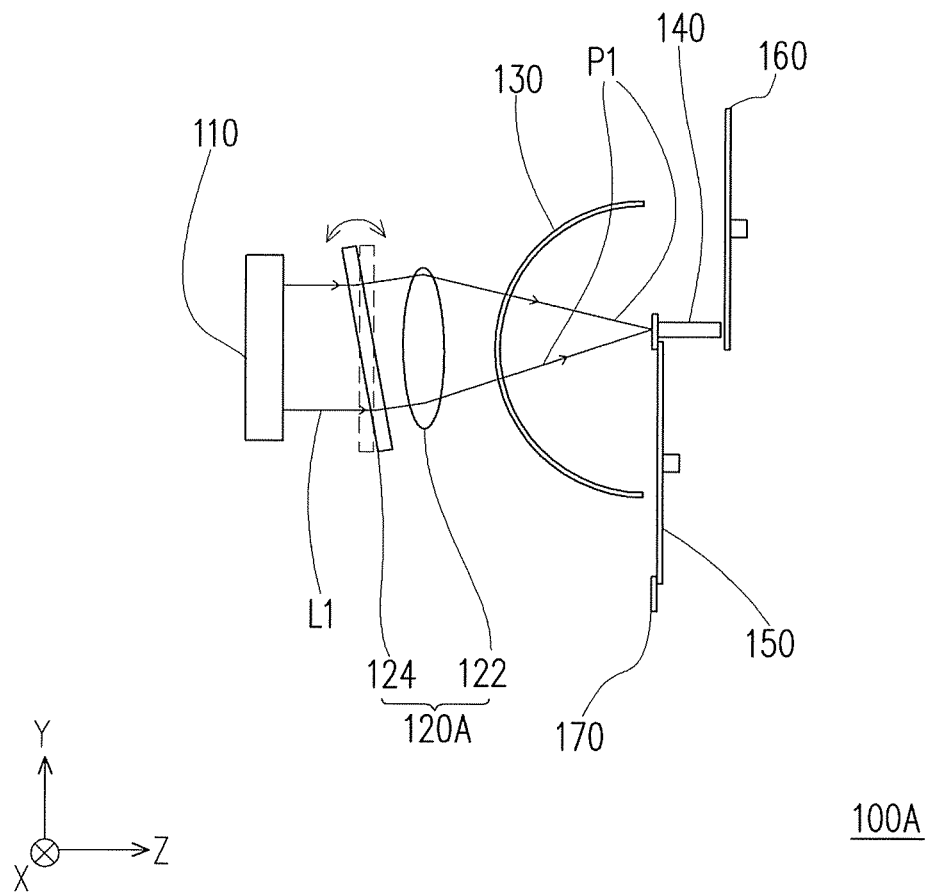
FIG. 4A and FIG. 4B are schematic side views of a light source module at a first timing and a second timing according to another embodiment of the invention.
Figure 4B:
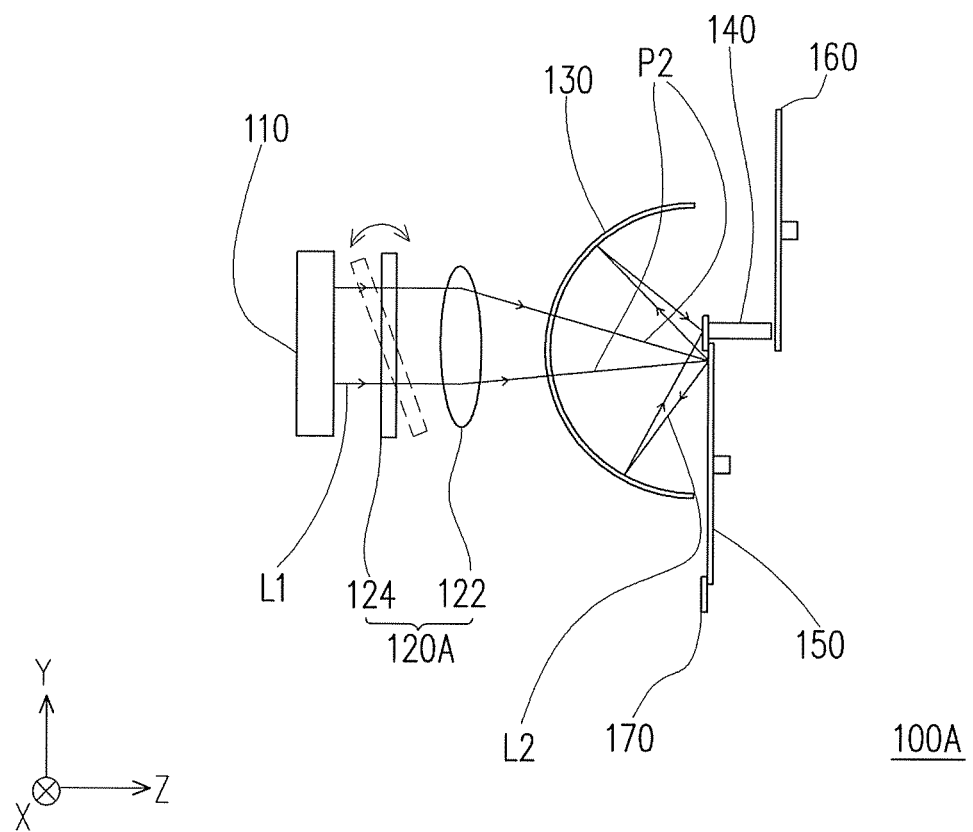

FIG. 4A and FIG. 4B are schematic side views of a light source module at a first timing and a second timing according to another embodiment of the invention. With reference to FIG. 4A and FIG. 4B, the light source module 100A provided in the present embodiment is similar to the light source module 100 depicted in FIG. 2A and FIG. 2B. The difference between the two lies in that the light guiding apparatus 120A provided in the present embodiment includes a lens element 122 and a transparent plate 124. The transparent plate 124 is disposed between the excitation light source 110 and the lens element 122. Here, the movable member in the light guiding apparatus 120A is the transparent plate 124, and a transmission direction of the excitation light beam L1 is changed through a swinging action of the transparent plate 124. In other words, in the present embodiment, the light source module 100A changes the transmission path of the excitation light beam L1 through swinging the transparent plate 124 by the actuator in the light guiding apparatus 120A. However, in other embodiments describing the light guiding apparatus 120A composed of different combinations of optical elements, the movable member of the light guiding apparatus 120A may be changed according to the spatial layout of the device, and the invention is not limited thereto.

Figure 5:
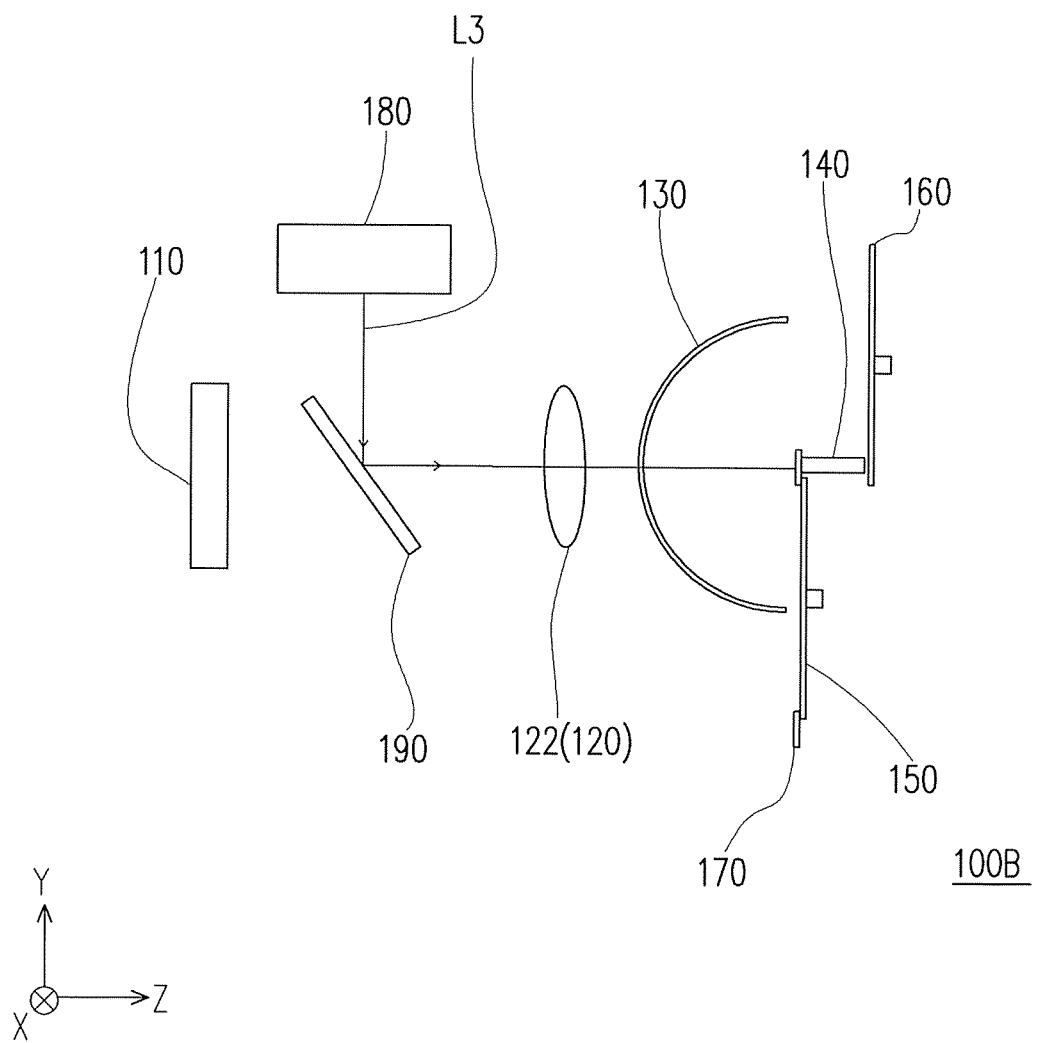
FIG. 5 is a schematic side view of a light source module at a first timing according to another embodiment of the invention.

FIG. 5 is a schematic side view of a light source module at a first timing according to another embodiment of the invention. With reference to FIG. 5, the light source module 100B provided in the present embodiment is similar to the light source module 100 depicted in FIG. 2A. The difference between the two lies in that the light source module 100B provided in the present embodiment further includes a supplemental light source 180 and a light splitting element 190. The supplemental light source 180 provides a supplemental light beam L3. The light splitting element 190 is disposed on the light path A and allows the excitation light beam L1 to pass through, reflect the supplemental light beam L3, and transmit the reflected supplemental light beam L3 to the light collecting element 130 along the first transmission path P1.

To be specific, in this embodiment, the light source module 100B is additionally equipped with the supplemental light source 180. The supplemental light beam L3 emitted by the supplemental light source 180 may be a light beam whose wavelength is different from or similar to the wavelength of the excitation light beam L1, and the supplemental light beam L3 is transmitted to the light collecting element 130 along the first transmission path P1 by the light splitting element 190. For instance, the excitation light beam L1 is, for example, a blue light beam, and the supplemental light beam L3 is, for example, a red light beam. Therefore, when the red light region of the light filtering element 160 is rotated to overlap with the light homogenizing element 140, the supplemental light beam L3 may be transmitted through the light homogenizing element 140 and the light filtering element 160 to improve the optical quality of the light source module 100B.

In other embodiments, however, the excitation light beam L1 is, for example, a blue light beam with a wavelength of 445 nm or 455 nm and the supplemental light beam L3 is, for example, a blue light beam with a wavelength of 460 nm. As such, the color representation of the excitation light beam L1 can be further optimized, so as to further improve the optical quality of the light source module 100B. Note that the invention is not limited to thereto.

The supplemental light source 180 may be selectively activated permanently according to the present embodiment. Alternatively, the supplemental light source 180 may be turned on at one part of the second timing and turned off at the first timing and at the other part of the second timing. In particular, the supplemental light source 180 may be turned on when the red light region of the light filtering element 160 is overlapped with the light homogenizing element 140, and the supplemental light source 180 may be turned off when the blue light region or the green light region of the light filtering element 160 is overlapped with the light homogenizing element 140. However, the invention is not limited thereto.

Figure 6:
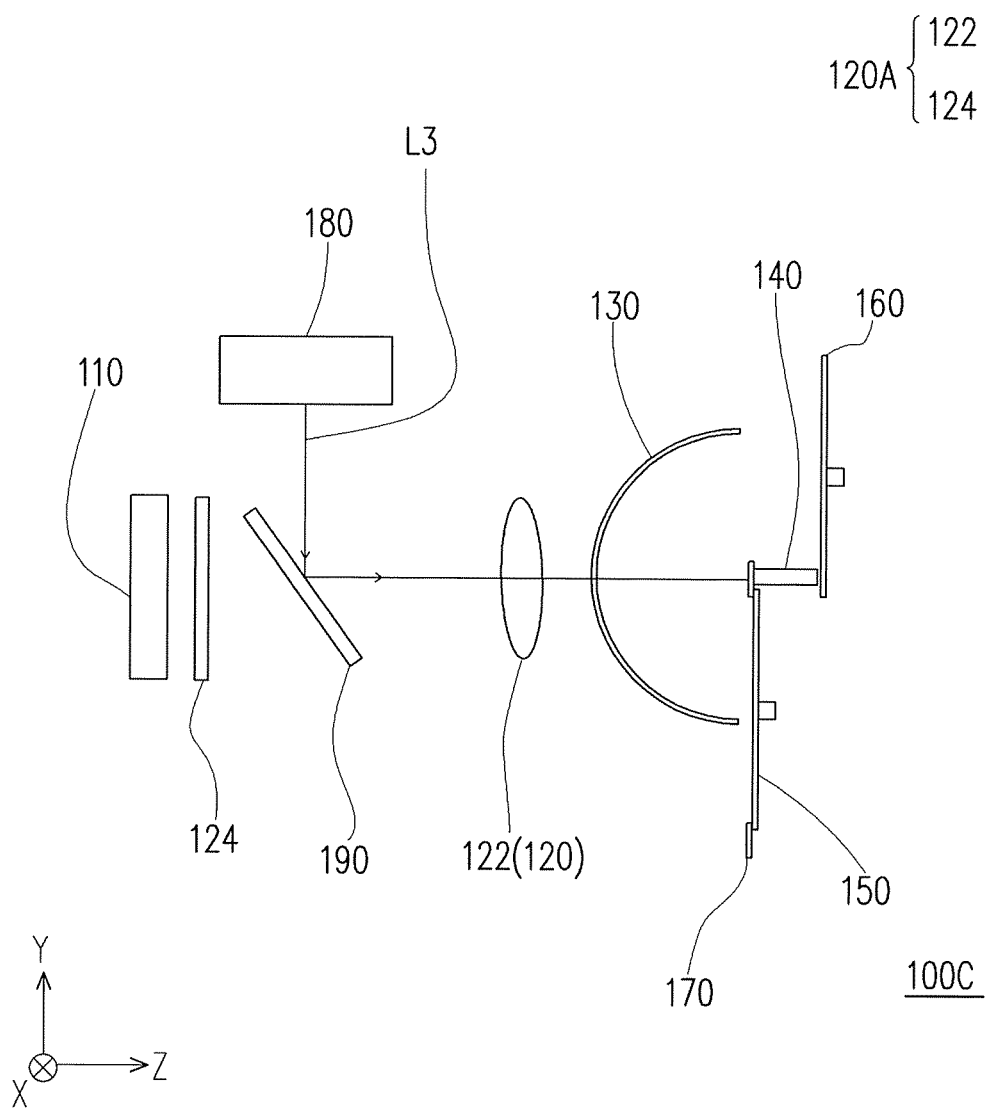
FIG. 6 is a schematic side view of a light source module at a first timing according to another embodiment of the invention.

FIG. 6 is a schematic side view of a light source module at a first timing according to another embodiment of the invention. With reference to FIG. 6, the light source module 100C provided in the present embodiment is similar to the light source module 100A depicted in FIG. 4A. The difference between the two lies in that the light source module 100C provided in the present embodiment further includes a supplemental light source 180 and a light splitting element 190. Particularly, the light splitting element 190 is disposed between the transparent plate 124 and the lens element 122. Sufficient teachings, suggestions, and the implementation thereof may be found in the previous paragraphs and may be known to people skilled in the art; therefore, no further explanation will be provided below.

Figure 7:
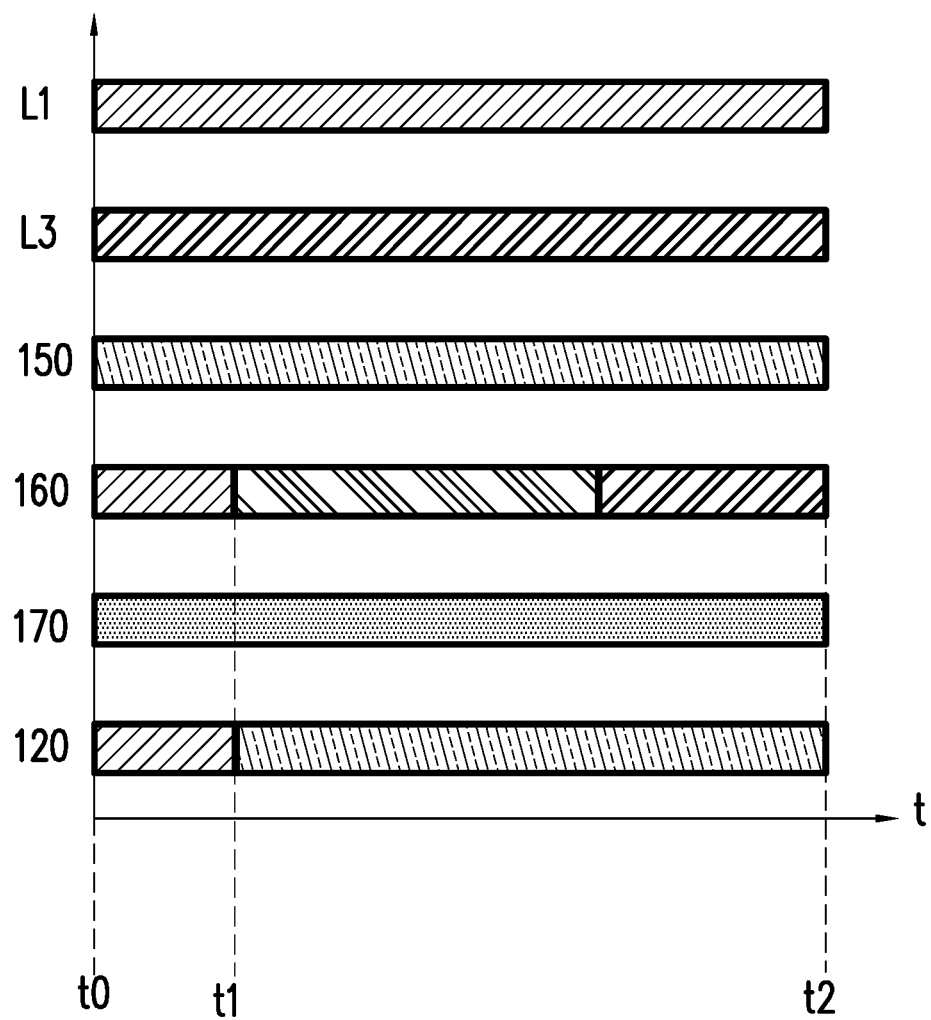
FIG. 7 is a schematic view showing status of each element changed together with time in a light source module according to an embodiment of the invention.

FIG. 7 is a schematic view showing status of each element changed together with time in a light source module according to an embodiment of the invention. With reference to FIG. 5 and FIG. 7, in the present embodiment, the status of each element changes together with time, and the status change is at least applicable to the light source module 100B depicted in FIG. 5; however, the invention is not limited thereto. The time t0 to the time t1 is the above-mentioned first timing, and the time t1 to the time t2 is the above-mentioned second timing. In this embodiment, the excitation light beam L1 and the supplemental light beam L3 are both turned on at the first timing and the second timing.

At the first timing, the excitation light beam L1 is sequentially transmitted by the light guiding apparatus 120 through the light scattering element 170, the light homogenizing element 140, and the first region of the light filtering element 160 (i.e., the blue light region). At the second timing, the excitation light beam L1 is sequentially transmitted by the light guiding apparatus 120 through the light scattering element 170, the light homogenizing element 140, and the green and red light regions in the second region of the light filtering element 160. At part of the second timing, the supplemental light beam L3 is transmitted through the reflection of the light splitting element 190 and the guidance of the light guiding apparatus 120 and sequentially passes through the light scattering element 170, the light homogenizing element 140, and the red light region of the light filtering element 160. The descriptions of the light collecting element allowing the excitation light beam L1 to pass through and reflecting the excited light beam L2 are omitted herein.

Figure 8:
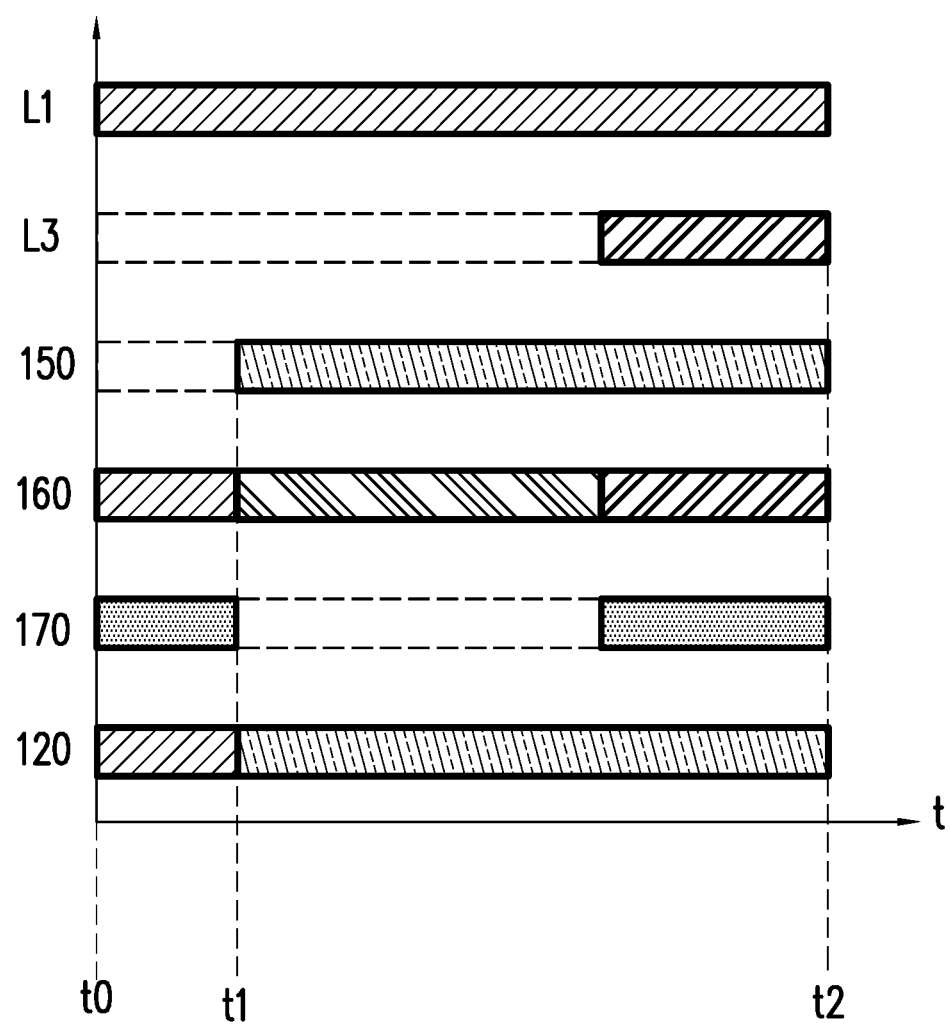
FIG. 8 is a schematic view showing status of each element changed together with time in a light source module according to another embodiment of the invention.

FIG. 8 is a schematic view showing status of each element changed together with time in a light source module according to another embodiment of the invention. With reference to FIG. 5 and FIG. 8, in the present embodiment, the status of each element changes together with time, and the status change is at least applicable to the light source module 100B depicted in FIG. 5; however, the invention is not limited thereto. The time-varying status change of each element provided in the present embodiment is similar to that depicted in FIG. 7, and the difference between the two lies in that the supplemental light beam L3 provided in the present embodiment may be turned on only at part of the second timing.

Specifically, the supplemental light beam L3 is turned on when the red light region in the second region of the light filtering element 160 rotates to overlap with the light homogenizing element 140. Besides, when the wavelength conversion element 150 provided in the present embodiment rotates to overlap with a portion of the light homogenizing element 140 at the first timing, the step of coating the wavelength conversion material may be omitted. Moreover, the light scattering region in the light scattering element 170 may only be overlapped with the blue and red light regions of the light filtering element 160. Thereby, use of materials and energy consumption can both be reduced.

In view of the above, the embodiments of the invention have at least one of the following advantages and effects. According to an embodiment of the invention, through the temporal swinging action of the light guiding apparatus, the excitation light beam provided by the excitation light source may be transmitted along the first transmission path and the second transmission path. At the first timing, the excitation light beam is sequentially transmitted along the first transmission path by the light guiding apparatus through the light collecting element and the light homogenizing element. At the second timing, the excitation light beam is sequentially transmitted along the second transmission path by the light guiding apparatus through the light collecting element and the wavelength conversion element, and the excitation light beam is converted into the excited light beam, reflected back to the light collecting element, and reflected by the light collecting element to the light homogenizing element. Thereby, the loss of the excitation beam in the light source module may be reduced so as to increase the usage efficiency of the beam energy, thereby improving the optical quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light source module adapted to provide an illumination light beam and comprising:
   an excitation light source adapted to provide an excitation light beam,
   a light guiding apparatus disposed on a light path of the excitation light beam and adapted to sequentially swing along a reference axis of the light path to change a transmission path of the excitation light beam, wherein the excitation light beam is, through the swinging action of the light guiding apparatus, transmitted along a first transmission path and a second transmission path at a first timing and a second timing, respectively;
   a light collecting element disposed on the first transmission path and the second transmission path of the excitation light beam and adapted to allow the excitation light beam to pass through;
   a light homogenizing element disposed on the first transmission path of the excitation light beam and adapted to receive the excitation light beam passing through the light collecting element; and
   a wavelength conversion element disposed on the second transmission path of the excitation light beam and adapted to convert the excitation light beam passing through the light collecting element into an excited light beam,
   wherein the light collecting element is adapted to reflect the excited light beam to the light homogenizing element, and the homogenizing element is adapted to receive the excitation light beam and the excited light beam, so as to generate the illumination light beam.

2. The light source module as recited in claim 1, wherein a light exiting surface of the wavelength conversion element and a light incident surface of the light homogenizing element are coplanar.

3. The light source module as recited in claim 1, wherein a distance between a center of a light spot generated at the light homogenizing element by the excitation light beam along the first transmission path and a center of a light spot generated at the wavelength conversion element by the excitation light beam along the second transmission path is equal to a minimum moving distance of the light spot while the light guiding apparatus swings.

4. The light source module as recited in claim 1, wherein the wavelength conversion element has a wavelength conversion region distributed adjacent to the light homogenizing element in the wavelength conversion element at the second timing.

5. The light source module as recited in claim 1, wherein the light guiding apparatus comprises a lens element and a transparent plate,
   wherein a transmission direction of the excitation light beam is changed through a swinging action of the transparent plate.

6. The light source module as recited in claim 1, wherein the light guiding apparatus is a lens element.

7. The light source module as recited in claim 1, further comprising:
   a light scattering element having scattering particles or optical micro-structures and disposed on the first transmission path.

8. The light source module as recited in claim 7, wherein the light scattering element is disposed on the wavelength conversion element and extended from an edge of the wavelength conversion element in a radial direction of the wavelength conversion element.

9. The light source module as recited in claim 7, wherein the light scattering element has a light scattering region, and the excitation light beam passes through the light scattering region at the first timing.

10. The light source module as recited in claim 1, further comprising a supplemental light source and a light splitting element,
    the supplemental light source provides a supplemental light beam, and
    the light splitting element is disposed on the light path and adapted to allow the excitation light beam to pass through, reflect the supplemental light beam, and transmit the reflected supplemental light beam to the light collecting element along the first transmission path.

11. The light source module as recited in claim 10, wherein the supplemental light source is turned on at one part of the second timing and is turned off at the first timing and at the other part of the second timing.

12. The light source module as recited in claim 1, further comprising:
    a light filtering element disposed on the first transmission path, the light filtering element having a first region allowing the excitation light beam to pass through and a second region allowing the excited light beam to pass through.

13. The light source module as recited in claim 12, wherein the light filtering element has a light scattering structure, and the light scattering structure is scattering particles or optical micro-structures.

14. The light source module as recited in claim 13, wherein a region where the light scattering structure is distributed corresponds to the first region and a portion of the second region of the light filtering element.

15. A projection device adapted to provide a projection light beam and comprising:
    a light source module adapted to provide an illumination light beam and comprising:
       an excitation light source providing an excitation light beam;
       a light guiding apparatus disposed on a light path of the excitation light beam and adapted to sequentially swing along a reference axis perpendicular to the light path to adjust a transmission path of the excitation light beam, wherein the excitation light beam is, through the swinging action of the light guiding apparatus, transmitted along a first transmission path and a second transmission path at a first timing and a second timing, respectively;
       a light collecting element disposed on the first transmission path and the second transmission path of the excitation light beam and adapted to allow the excitation light beam to pass through;
       a light homogenizing element disposed on the first transmission path of the excitation light beam and adapted to receive the excitation light beam passing through the light collecting element; and a wavelength conversion element disposed on the second transmission path of the excitation light beam and adapted to convert the excitation light beam passing through the light collecting element into an excited light beam;

a optical engine module disposed on a transmission path of the illumination light beam and adapted to convert the illumination light beam into an image light beam; and a lens disposed on a transmission path of the image light beam and adapted to convert the image light beam into the projection light beam, wherein the light collecting element is adapted to reflect the excited light beam to the light homogenizing element, and the homogenizing element is adapted to receive the excitation light beam and the excited light beam, so as to generate the illumination light beam.

\* \* \* \* \*